(12) United States Patent
Wen et al.

(10) Patent No.: US 7,778,256 B2
(45) Date of Patent: Aug. 17, 2010

(54) METHOD AND SYSTEM FOR IMPLEMENTING VIRTUAL CIRCUIT STATUS CONSISTENCY

(75) Inventors: Yuangui Wen, Shenzhen (CN); Peng Zhou, Shenzhen (CN); Chunzhe Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 160 days.

(21) Appl. No.: 12/109,767

(22) Filed: Apr. 25, 2008

(65) Prior Publication Data

US 2008/0205404 A1 Aug. 28, 2008

Related U.S. Application Data

(63) Continuation of application No. PCT/CN2006/001644, filed on Jul. 11, 2006.

(30) Foreign Application Priority Data

Oct. 28, 2005 (CN) .......................... 2005 1 0116786

(51) Int. Cl.
*H04L 12/28* (2006.01)
*H04L 12/56* (2006.01)
(52) U.S. Cl. ....................... 370/397; 370/399
(58) Field of Classification Search .......... 370/397, 370/399
See application file for complete search history.

(56) References Cited

U.S. PATENT DOCUMENTS

2002/0009088 A1* 1/2002 Donaghey et al. ........... 370/397
2004/0196827 A1 10/2004 Xu et al.
2005/0053079 A1* 3/2005 Havala ....................... 370/400
2005/0226224 A1 10/2005 Lee et al.

FOREIGN PATENT DOCUMENTS

CN 1681256 A 10/2005
KR 2005041268 A 5/2005

OTHER PUBLICATIONS

Kompella, K, et al.; "draft-ietf-l2vpn-vpls-bgp-05; Virtual Private LAN Service"; Juniper Networks; Apr. 8, 2005; Internet-Draft; pp. 1-28.
"Studies on the application of BGP in IPv6 networks"; and English Abstract thereof.
Chinese Office Action for Chinese Patent Application No. 2005101167864, dated Oct. 24, 2009, and English translation thereof.
International Search Report for International Application No. PCT/CN2006/001644, dated Nov. 9, 2006, with English translation.

* cited by examiner

*Primary Examiner*—Ronald Abelson

(57) ABSTRACT

A method and a system for implementing virtual circuit status consistency. A transmitting provider edge router (PE) send an extended network layer reachability information (NLRI) message to a remote PE; the remote PE updates the status of the virtual circuit from the remote PE to the transmitting PE, according to the received extended NLRI message, so as to make the status of the virtual circuits between the transmitting PE and the remote PE consistent. A system for implementing virtual circuit status consistency, the first provider edge router (PE1) in the system sending an extended network layer reachability information (NLRI) message to a second provider edge router (PE2); the PE2 updates the status of the virtual circuit from the PE2 to the PE1 according to the received extended NLRI message, so as to make the status of the bidirectional virtual circuits between the PE1 and the PE2 consistent.

17 Claims, 2 Drawing Sheets

METHOD AND SYSTEM FOR IMPLEMENTING VIRTUAL CIRCUIT STATUS CONSISTENCY

CROSS-REFERENCE TO RELATED APPLICATIONS

This application is a continuation of International Application No. PCT/CN2006/001644, filed Jul. 11, 2006. This application claims the benefit of Chinese Application No. 200510116786.4, filed Oct. 28, 2005. The disclosures of the above applications are incorporated herein by reference.

FIELD

The present disclosure relates to the field of communication technology and to a method and a system for monitoring virtual circuit status.

BACKGROUND

The statements in this section merely provide background information related to the present disclosure and may not constitute prior art.

When IP networks become a dominant network of telecommunication operators, services based on IP network are in great need. Initially, in order to provide the services based on IP network for an enterprise, telecommunication operators provide a layer 2 link for the enterprise by leasing private lines, however, this approach requires more construction time and high cost while making the sharing and management difficult. Later, with the development of asynchronous transfer mode (ATM) and frame relay technology, telecommunication operators provide a point-to-point layer 2 connection for a customer by virtual circuit mode, and the customer can construct its own layer 3 network on the layer 2 connection for carrying data stream of IP, IPX etc. Compared with the private line leasing mode, the virtual circuit mode has advantages of consuming less time and low cost, but in order to provide virtual private network (VPN) service and Internet service in different types of networks (e.g., ATM, frame relay), the operator needs to construct and maintain two individual networks, thus leading to high cost; and, the speed of the virtual circuit mode is slow; furthermore, the configuration of the virtual circuit mode is still complex, especially when a station needs to be added, the administrator is required to do lots of configuration work.

In order to solve the existing considerations in the above private line leasing mode and virtual circuit mode, multi-protocol label switching layer 2 virtual private network (MPLS L2VPN) technology emerges. The technology can provide IP service and layer 2 VPN service in a same network simultaneously. It also has the features of setting arbitrary speed conveniently and configuring easily. By utilizing this technology, the operator can manage and operate one network to provide many services such as IP service, layer 3 VPN, layer 2 VPN, traffic engineering and differentiated services simultaneously, so as to reduce a lot of costs of construction, maintenance, and operation. MPLS L2VPN service is more and more popular with the enterprises which can manage by themselves the route construction of their own networks or those who do not want to expose its network planning to the operator.

MPLS L2VPN includes virtual private LAN service (VPLS) and virtual leased line (VLL). The VPLS is one type of layer 2 VPN, and MPLS VPLS technology transparently transfers Ethernet data of a subscriber in a MPLS network. In view of the subscriber, the MPLS network applying MPLS VPLS technology is a layer 2 switching network, through which an Ethernet-based layer 2 connection may be established between different subscriber stations.

There are two primary drafts in the current VPLS: draft-ietf-l2vpn-vpls-bgp-XX and draft-ietf-l2vpn-vpls-ldp-XX. The draft draft-ietf-l2vpn-vpls-ldp-XX defines a solution of establishing virtual circuit by border gateway protocol (BGP), and then implementing VPLS, i.e., VPLS in VPLS BGP mode. In the solution, each provider edge router (PE) participating in providing VPLS service in core network establishes full connections with all other PEs, sends a multi-protocol reachablility/unreachablility network layer information message including VPLS station information to the other PEs via BGP, performs parameter negotiating, and establishes and releases virtual circuits between VPLS stations, so as to connect every VPLS station together to construct VPLS network.

In the solution of VPLS in VPLS BGP mode, the PE determines whether to send the multi-protocol reachablility/unreachablility network layer information message including the VPLS station information to other PEs according to a status of access circuit (AC). The virtual circuits between the VPLS stations are bidirectional. The disadvantage of the above solution of VPLS in VPLS BGP mode is that the solution may cause status inconsistency of the corresponding VPLS virtual circuits between PEs.

The rules for establishing virtual circuits in the current VPLS BGP are: after a VPLS station is configured in a PE participating in providing VPLS service, the PE sends a network layer reachability information (NLRI) message including information of the local VPLS station to other PEs in the network. The basic unit of the NLRI message is label block, each label of which represents a virtual circuit from the PE to a VPLS station on another PE.

In the networking shown in FIG. 1, it is assumed that three CE devices connected with respective PEs belong to a same VPLS network X. The PE1 is configured with a VPLS station whose identifier is M, with the offset of a label block generated by the PE1 being VBO, the size of the label block being VBS, and the label base value being LB. The PE2 is also configured with a VPLS station whose identifier is N.

After the PE2 receives an NLRI message sent by the PE1, the PE2 performs the processes as follows:

Determining whether the condition VBO≦N<VBO+VBS is satisfied or not. If the condition VBO≦N<VBO+VBS is satisfied, the station N belongs to a remote VPLS station set of the PE1, and then the PE2 establishes a virtual circuit to the PE1. The label from the PE2 to the PE1 is: LB+N−VBO; if the condition VBO≦N<VBO+VBS is not satisfied, the PE2 ignores the NLRI message, and does not establish a virtual circuit to the PE1.

In the same way, after the PE1 receives an NLRI message sent by the PE2, the PE1 performs the same processes. If the station M also belongs to a remote VPLS station set of the PE2, it is supposed that the offset of a label block generated by the PE2 is VBO', the size of the label block is VBS', and the label base value is LB', then the PE1 may establish a virtual circuit from the PE1 to the PE2. The label from the PE1 to the PE2 is: LB'+M−VBO'.

All the PEs are in the same autonomous system and each PE belongs to the same VPLS VPN, with the tunnels between the PEs being fully connected. According to VPLS BGP protocol, after the PE1, PE2, and PE3 transfer NLRI messages including local VPLS station information to one another, virtual circuits are established between every two of the three PEs through parameter negotiation.

If for some reason (e.g., the interface of the PE1 does not enable LDP protocol), the tunnel from the PE1 to the PE2 does not exist but the tunnel from the PE2 to the PE1 still exists, then the PE1 obtains that the tunnel from itself to the PE2 does not exist and sets the status of the virtual circuit from the PE1 to the PE2 as DOWN (unavailable), and delete the related VPLS forwarding entries to the PE2.

However, the PE1 can not send an NLRI message indicating unreachability to the PE2 at this time, because there is BGP neighborhood from the PE1 to the PE2 and the PE3, and if the PE1 sends the NLRI message indicating unreachability to the PE2, then the PE3 also receives the NLRI message indicating unreachability and both the PE3 and the PE2 release the virtual circuits to the PE1, to cause the virtual circuit between the PE3 and the PE1 to be also released. Because the PE1 can not send an NLRI message indicating unreachability to the PE2, the PE2 still deems that the virtual circuit from itself to the PE1 is UP (available), resulting in the condition of the inconsistency of the corresponding virtual circuit status of the PE2 and the PE1. In the above condition of the inconsistency, because the PE1 does not have the VPLS forwarding entries to the PE2, the PE1 only sends broadcast data, multicast data, and unknown unicast data sent from Customer Edge (CE) 1 to the PE3; and the PE2 makes two copies of broadcast data, multicast data, and unknown unicast data sent from CE2, which will be sent to the PE1 and the PE3. When there are a lot of VPLS stations configured on the PE2, those useless data sent to the PE1 will aggravate the burdens of the routers and the whole network.

SUMMARY

A method and a system for implementing virtual circuit status consistency, so that the corresponding virtual circuit status between PEs in VPLS is consistent.

A method for implementing virtual circuit status consistency includes:

sending an extended network layer reachability information (NLRI) message from a first provider edge router to a second provider edge router;

determining, by the second provider edge router, a status of a virtual circuit from the first provider edge router to the second provider edge router, according to the received extended NLRI message, then updating a status of a virtual circuit from the second provider edge router to the first provider edge router, so as to make the status of the virtual circuit from the second provider edge router to the first provider edge router consistent with that from the first provider edge router to the second provider edge router.

The extended NLRI message includes a circuit status vector (CSV) property, and the CSV property includes: Type, Length, and Value; the Type representing a type of the CSV property, the Length representing a count of bit vector of the Value, and the Value representing bit vector showing a status of a virtual circuit.

The method further includes:

establishing, by the first provider edge router, the virtual circuit with the second provider edge router;

acquiring, by the second provider edge router, a value of the CSV property in the extended NLRI message, when the first provider edge router sends the extended NLRI message including local information to the second provider edge router, and determining the status of the virtual circuit from the first provider edge router to the second provider edge router, according to the value of the CSV property;

establishing the virtual circuit from the second provider edge router to the first provider edge router, the status of the virtual circuit from the second provider edge router to the first provider edge router being consistent with the status of the virtual circuit from the first provider edge router to the second provider edge router.

setting a status of the CSV property sent from the first provider edge router to the second provider edge router as unavailable, and sending an NLRI message including the amended CSV property to the second provider edge router, when the first provider edge router detects that the status of the virtual circuit from the first provider edge router to the second provider edge router is unavailable;

parsing, by the second provider edge router, the amended CSV property to acquire the value of the CSV property, and setting the status of the virtual circuit from the second provider edge router to the first provider edge router as unavailable when determining that the status of the virtual circuit from the first provider edge router to the second provider edge router is unavailable.

The virtual circuit is a virtual circuit in virtual private LAN service (VPLS) or virtual leased line (VLL).

The first provider edge router detects the status of the virtual circuit from the first provider edge router to the second provider edge router in real time.

A system for implementing virtual circuit status consistency includes a first provider edge router and a second provider edge router, the first provider edge router includes a message sending module adapted to send an extended network layer reachability information (NLRI) message;

the second provider edge router includes a status determining module adapted to determine a status of a virtual circuit from the first provider edge router to the second provider edge router according to the received extended NLRI message;

a status updating module adapted to update a status of a virtual circuit from the second provider edge router to the first provider edge router, so as to make the status of the virtual circuit from the second provider edge router to the first provider edge router consistent with that from the first provider edge router to the second provider edge router.

The status determining module includes a message parsing unit adapted to parse the extended NLRI message sent by the first provider edge router to acquire a value of a circuit status vector (CSV) property in the extended NLRI message.

The status updating module includes a status setting unit adapted to set the status of the virtual circuit from the second provider edge router to the first provider edge router according to the CSV property acquired by the message parsing unit.

The first provider edge router further includes a detecting module adapted to detect the status of the virtual circuit from the first provider edge router to the second provider edge router in real time.

The Circuit Status Vector (CSV) property is carried in the extended NLRI message which is sent by a PE to a remote PE, and the remote PE updates a status of a virtual circuit from the remote PE to the transmitting-side PE according to the received extended NLRI message carrying the CSV property, so as to make the status of corresponding virtual circuits between PEs in VPLS consistent. The burdens of routers in the VPLS network are reduced and the stability of the VPLS network is improved.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

A method and a system for implementing virtual circuit status consistency. A CSV property is carried in an extended NLRI message which is sent by a PE to a remote PE. The remote PE processes a status of a corresponding virtual circuit according to the value of the CSV property in the received extended NLRI message.

Figure 2:
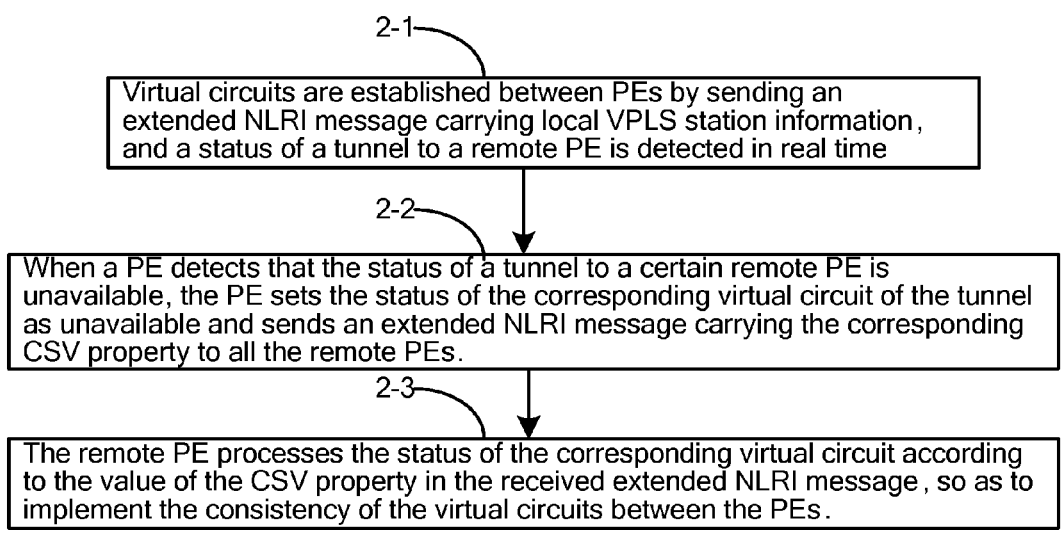
FIG. 2 is a flow chart of a method provided according to various embodiments.

The present teachings are described in detail in conjunction with appended drawings. The processing procedure is shown in FIG. 2, including the following processes.

At block 2-1, virtual circuits are established between PEs by sending an extended NLRI message carrying local VPLS station information, and status of a tunnel to a remote PE is detected in real time.

A new property is added into an NLRI message: circuit status vector (CSV) which is an extension to the NLRI message. The property is represented by a triplet TLV (Type, Length, Value). The Type occupies one byte, and may be defined as 0x01; the Length occupies two bytes, and represents a count of bit vector within the Value; the Value occupies integral bytes, and represents bit vector in the message, each bit of which corresponds to one label in a label block carried in the NLRI message, and the value of the bit represents a status of the corresponding virtual circuit of the label. In practical application, UP (available) status may be represented by 0, and DOWN (unavailable) status may be represented by 1.

Therefore, the present teachings modify the above procedure of establishing virtual circuits. Taking the networking shown in FIG. 1 as an example, the modified procedure is as follows.

After a PE1 is configured with a VPLS station, the PE1 sends an extended NLRI message carrying CSV property to a PE2 and a PE3. Each bit of the CSV property is set as 0, which represents that the status of the local VPLS station of the PE1 is available, and the tunnels from the PE1 to the PE2 and the PE3 are available. The PE2 and the PE3 also perform the same processes as the PE1.

After the PE1 receives the extended NLRI messages sent by the PE2 and the PE3, the PE1 establishes virtual circuits from the PE1 to the PE2 and the PE3 respectively according to the above mentioned known rules for establishing virtual circuit. The PE2 and the PE3 also perform the same processes as the PE1.

The above CSV property can be used in both PE in an autonomous system and PEs across autonomous system.

After the virtual circuits between the PEs are established, all the PEs detect the status of the tunnels to the remote PEs.

At block 2-2, when a PE detects that the status of a tunnel to a certain remote PE is unavailable, the PE sets the status of the corresponding virtual circuit of the tunnel as unavailable and sends an extended NLRI message carrying the corresponding CSV property to all the remote PEs.

When a PE detects that a tunnel to a certain remote PE is unavailable, the PE sets the status of the corresponding virtual circuit of the tunnel as DOWN status and sends an extended NLRI message carrying the corresponding CSV property to all the remote PEs. In the carried CSV property, a bit corresponding to the virtual circuit with DOWN status is set as 1, and the bits corresponding to other virtual circuits with UP status is still 0.

Figure 1:
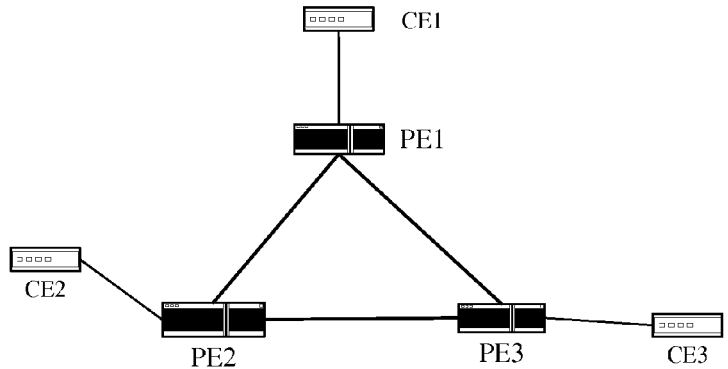
FIG. 1 shows a schematic diagram of a VPLS networking architecture according to various embodiments.

For example, in the networking shown in FIG. 1, when the PE1 detects that the status of the tunnel to the PE2 is unavailable, the PE1 sends an extended NLRI message carrying the corresponding CSV property to the PE2 and PE3 again. The bit in the carried CSV property corresponding to the virtual circuit from the PE1 to the PE2 is set as 1 so as to represent the virtual circuit from the PE1 to the PE2 unavailable, and a bit corresponding to the virtual circuit from the PE1 to the PE3 is still 0 so as to represent the virtual circuit from the PE1 to the PE3 available.

At block 2-3, the remote PE processes the status of the corresponding virtual circuit according to the value of the CSV property in the received extended NLRI message, so as to implement the consistency of the virtual circuits between the PEs.

After the remote PE receives the extended NLRI message carrying the CSV property, the remote PE processes the status of the corresponding virtual circuit according to the value of the bit in the CSV property; the value represents the status of the virtual circuit. When the value is 0, the status of the corresponding virtual circuit is set as UP status; when the value is 1, the status of the corresponding virtual circuit is set as DOWN status. Thus, the virtual circuit status consistency is implemented.

For example, in the networking shown in FIG. 1, after the PE2 receives the extended NLRI message sent by the PE1, the PE2 obtains that the status of the virtual circuit from the PE1 to the PE2 is DOWN status according to the CSV property carried in the extended NLRI message. So, the PE2 sets the status of the virtual circuit from the PE2 to the PE1 as DOWN status. Thus, the status of the virtual circuits between the PE1 and the PE2 is DOWN status, ensuring the consistency of the status of the virtual circuits between the PE1 and the PE2; and after the PE3 receives the extended NLRI message, the PE3 finds that the status of the virtual circuit from the PE1 to itself does not change, thus no processing is required, and the status of the virtual circuits between the PE1 and the PE3 is UP status.

A system for implementing virtual circuit status consistency is also provided and the system includes a first provider edge router PE1 and a second provider edge router PE2.

The first provider edge router PE1 sends an extended network layer reachability information (NLRI) message to the second provider edge router PE2. The second provider edge router PE2 updates the status of the virtual circuit from the second provider edge router PE2 to the first provider edge router PE1, according to the received extended NLRI message, so as to make the status of the bidirectional virtual circuits between the first provider edge router PE1 and the second provider edge router PE2 consistent.

The first provider edge router PE1 and the second provider edge router PE2 are located in a same autonomous system or in different autonomous systems.

The extended NLRI message includes a circuit status vector (CSV) property.

After the second provider edge router PE2 receives the extended NLRI message, the second provider edge router PE2 determines the status of the virtual circuit from the first provider edge router PE1 to the second provider edge router PE2 according to the value of the CSV property in the extended NLRI message, and makes the status of the bidirectional virtual circuits between the first provider edge router PE1 and the second provider edge router PE2 consistent.

The first provider edge router PE1 sends the extended NLRI message including local information to the second provider edge router PE2, establishes bidirectional virtual circuits with the second provider edge router PE2 and detects the status of the tunnel to the second provider edge router PE2 in real time.

When the first provider edge router PE1 detects that the status of the tunnel to the remote PE2 is unavailable, the first provider edge router PE1 sets the CSV property from the PE1 to the second provider edge router PE2 as unavailable status, and sends the NLRI message including the amended CSV property to the second provider edge router PE2.

Figure 3:
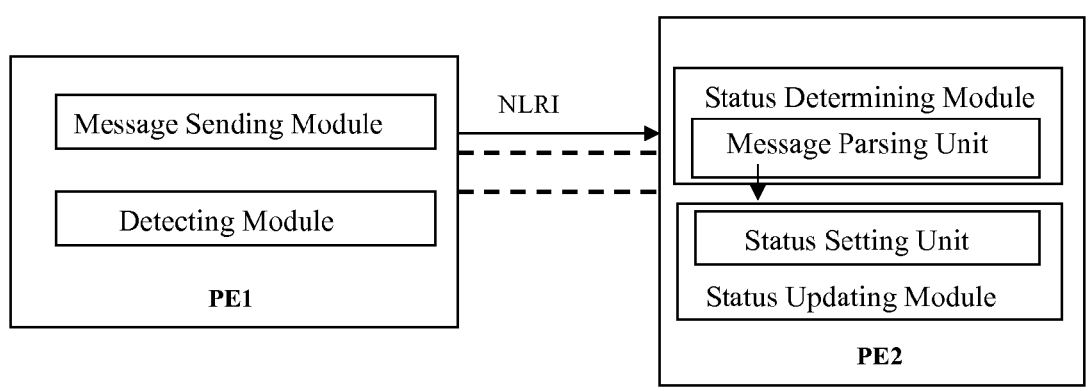
FIG. 3 shows a schematic construction diagram of a PE in a system for implementing virtual circuit status consistency according to various embodiments.

As shown in FIG. 3, the first provider edge router PE1 includes a message sending module adapted to send an extended network layer reachability information (NLRI) message.

The second provider edge router PE2 includes:

a status determining module adapted to determine the status of the virtual circuit from the first provider edge router PE1 to the second provider edge router PE2 according to the received extended NLRI message;

a status updating module adapted to update the status of the virtual circuit from the second provider edge router PE2 to the first provider edge router PE1, so as to make the status of the virtual circuit from the second provider edge router to the first provider edge router PE1 consistent with that from the first provider edge router PE1 to the second provider edge router PE2.

The status determining module includes a message parsing unit adapted to parse the extended NLRI message sent by the first provider edge router PE1 to acquire the value of the circuit status vector (CSV) property which is included in the extended NLRI message.

The status updating module includes a status setting unit adapted to set the status of the virtual circuit from the second provider edge router PE2 to the first provider edge router PE1 according to the CSV property acquired by the message parsing unit.

The first provider edge router PE1 further includes a detecting module adapted to detect the status of the virtual circuit from the first provider edge router PE1 to the second provider edge router PE2 in real time.

What is described above are various embodiments, but the protection scope of the present invention is not limited to these embodiments. The modifications or substitutions which are obvious to those skilled in the art through the disclosure should be covered within the protection scope of the present teachings. Therefore, the protection scope of the present teachings should be defined by the protection scope of the claims.

What is claimed is:

1. A method for implementing virtual circuit status consistency, comprising:

receiving, by a second provider edge router, a first extended network layer reachability information (NLRI) message from a first provider edge router, wherein the NLRI includes a circuit status vector (CSV) property;

when a first value included in the CSV property represents that a station of the first provider edge router is available, establishing, by the second provider edge router, a virtual circuit from the second provider edge router to the first provider edge router;

determining, by the second provider edge router, a status of a virtual circuit from the first provider edge router to the second provider edge router, according to a second extended NLRI message received from the first provider edge router, wherein a second value included in the CSV property represents the status of the virtual circuit from the first provider edge router to the second provider edge router; and updating, by the second provider edge router, a status of the virtual circuit from the second provider edge router to the first provider edge router, so as to make the status of the virtual circuit from the second provider edge router to the first provider edge router consistent with that of the virtual circuit from the first provider edge router to the second provider edge router.

2. The method according to claim 1, wherein establishing, by the second provider edge router, a virtual circuit from the second provider edge router to the first provider edge router comprising:

acquiring, by the second provider edge router, a first value of the CSV property in the first extended NLRI message, when the first provider edge router sends the extended NLRI message comprising local information to the second provider edge router, determining the status of the virtual circuit from the first provider edge router to the second provider edge router, according to the first value of the CSV property, and establishing the virtual circuit from the second provider edge router to the first provider edge router, the status of the virtual circuit from the second provider edge router to the first provider edge router being consistent with the status of the virtual circuit from the first provider edge router to the second provider edge router.

3. A computer program product, characterized by comprising computer program codes which, when executed by a computer unit, will cause the computer unit to perform the method according to claim 2.

4. The method according to claim 1, wherein determining, by the second provider edge router, a status of a virtual circuit from the first provider edge router to the second provider edge router, according to a second extended NLRI message received from the first provider edge router comprising:

acquiring, by the second provider edge router, a second NLRI message comprising the CSV property, wherein the CSV property set as unavailable by the first provider edge router when the first provider edge router detects that the status of the virtual circuit to the second provider edge router is unavailable;

parsing, by the second provider edge router, the CSV property to acquire a second value of the CSV property, and setting the status of the virtual circuit from the second provider edge router to the first provider edge router as unavailable when determining that the status of the virtual circuit from the first provider edge router to the second provider edge router is unavailable.

5. A computer program product, characterized by comprising computer program codes which, when executed by a computer unit, will cause the computer unit to perform the method according to claim 4.

6. The method according to claim 1, wherein the virtual circuit is a virtual circuit in virtual private LAN service (VPLS) or virtual leased line (VLL).

7. A computer program product, characterized by comprising computer program codes which, when executed by a computer unit, will cause the computer unit to perform the method according to claim 6.

8. A computer program product, characterized by comprising computer program codes which, when executed by a computer unit, will cause the computer unit to perform the method according to claim 1.

9. A computer program product, characterized by comprising computer program codes which, when executed by a computer unit, will cause the computer unit to perform the method according to claim 1.

10. A system for implementing virtual circuit status consistency, comprising a first provider edge router and a second provider edge router, wherein,
the first provider edge router is adapted to send an extended network layer reachability information (NLRI) message, wherein the NLRI includes a circuit status vector (CSV) property;
the second provider edge router is adapted to establish a virtual circuit from the second provider edge router to the first provider edge router when a first value included in the CSV property of a first NLRI message represent that a station of the first provider edge router is available;
the second provider edge router is further adapted to determine a status of a virtual circuit from the first provider edge router to the second provider edge router according to a second extended NLRI message received from the first provider edge router, and update a status of the virtual circuit from the second provider edge router to the first provider edge router, so as to make the status of the virtual circuit from the second provider edge router to the first provider edge router consistent with that from the first provider edge router to the second provider edge router, wherein a second value included in the CSV property represents the status of the virtual circuit from the first provider edge router to the second provider edge router.

11. The system according to claim 10, wherein the second provider edge router comprises:
a status determining module adapted to determine the status of the virtual circuit from the first provider edge router to the second provider edge router according to the received extended NLRI message;
a status updating module adapted to update the status of the virtual circuit from the second provider edge router to the first provider edge router.

12. The system according to claim 11, wherein the status determining module comprises:
a message parsing unit adapted to parse the extended NLRI message sent by the first provider edge router to acquire a value of a circuit status vector (CSV) property in the extended NLRI message.

13. The system according to claim 12, wherein the status updating module comprises:
a status setting unit adapted to set the status of virtual circuit from the second provider edge router to the first provider edge router according to the CSV property acquired by the message parsing unit.

14. The system according to claim 10, wherein the first provider edge router further comprises:
a detecting module adapted to detect the status of the virtual circuit from the first provider edge router to the second provider edge router.

15. A router, comprising:
a module adapted to receive an extended network layer reachability information (NLRI) message, wherein the NLRI includes a circuit status vector (CSV) property;
a module adapted to establish a virtual circuit from the present router to another router when a first value included in the CSV property of a first NLRI message represents that a station of the another router is available;
a status determining module adapted to determine a status of a virtual circuit from the another router to the present router according to a second extended NLRI message received from the another router; and
a status updating module adapted to update a status of the virtual circuit from the present router to the other router, so as to make the status of the virtual circuit from the present router to the another router consistent with the status of the virtual circuit from the another router to the present router.

16. The router according to claim 15, wherein the status determining module comprises:
a message parsing unit adapted to parse the extended NLRI message sent by the another router to acquire a value of a circuit status vector (CSV) property in the extended NLRI message.

17. The router according to claim 16, wherein the status updating module comprises:
a status setting unit adapted to set the status of the virtual circuit from the present router to the another router according to the CSV property acquired by the message parsing unit.

* * * * *